US012558702B2

(12) United States Patent
Reger et al.

(10) Patent No.: US 12,558,702 B2
(45) Date of Patent: Feb. 24, 2026

(54) MANUFACTURING CONTAINERS

(71) Applicant: Gerresheimer Regensburg GmbH, Regensburg (DE)

(72) Inventors: Florian Reger, Pfreimd (DE); Guenther Scheck, Zangenstein (DE)

(73) Assignee: Gerresheimer Regensburg GmbH, Regensburg (DE)

( * ) Notice: Subject to any disclaimer, the term of this patent is extended or adjusted under 35 U.S.C. 154(b) by 81 days.

(21) Appl. No.: 18/356,401

(22) Filed: Jul. 21, 2023

(65) Prior Publication Data

US 2023/0372959 A1 Nov. 23, 2023

Related U.S. Application Data

(62) Division of application No. 17/403,183, filed on Aug. 16, 2021, now Pat. No. 11,745,205.

(30) Foreign Application Priority Data

Aug. 17, 2020 (EP) .................................... 20191379

(51) Int. Cl.

| | |
|---|---|
| ***B05D 1/36*** | (2006.01) |
| ***B05B 13/02*** | (2006.01) |
| ***B05B 13/04*** | (2006.01) |
| ***B05B 13/06*** | (2006.01) |
| ***B05D 7/22*** | (2006.01) |
| ***B25B 1/04*** | (2006.01) |
| ***B25B 1/24*** | (2006.01) |

(52) U.S. Cl.

CPC ...... *B05B 13/0436* (2013.01); *B05B 13/0235* (2013.01); *B05B 13/0627* (2013.01); *B05D 1/36* (2013.01); *B05D 7/227* (2013.01); *B25B 1/04* (2013.01); *B25B 1/2442* (2013.01)

(58) Field of Classification Search

None

See application file for complete search history.

(56) References Cited

U.S. PATENT DOCUMENTS 4,786,063 A 11/1988 Engelhardt et al.
5,425,460 A 6/1995 Barbarian
6,503,328 B1 * 1/2003 Buschmeier .............. B05C 3/10 118/503

(Continued)

FOREIGN PATENT DOCUMENTS

CN 1572334 A 2/2005
CN 101879342 A 6/2014

(Continued)

OTHER PUBLICATIONS

European Office Action in European Appln. No. 20191379.5, dated Oct. 27, 2023, 4 pages.

(Continued)

*Primary Examiner* — Joshua L Allen
*Assistant Examiner* — Bradford M Gates
(74) *Attorney, Agent, or Firm* — Fish & Richardson P.C.

(57) ABSTRACT

A holder, a transport device, and a method of manufacturing a container are described. The container comprises a body that extends along an axis and a flange that extends radially to the axis, and the holder comprises one or more fastening elements that are configured to engage one or more of a top surface, a bottom surface, or a peripheral surface of the flange.

12 Claims, 8 Drawing Sheets

(56) References Cited

U.S. PATENT DOCUMENTS

| | | | |
|---|---|---|---|
| 6,958,097 B2 | 10/2005 | Lüttringhaus-Henkel et al. | |
| 2004/0249276 A1 | 12/2004 | Nemoto et al. | |
| 2005/0039417 A1 | 2/2005 | Liedtke et al. | |
| 2010/0286609 A1 | 11/2010 | Mahurkar | |
| 2013/0057677 A1* | 3/2013 | Weil | G01N 21/9081 348/125 |
| 2013/0190694 A1 | 7/2013 | Barrow-Williams et al. | |
| 2016/0256621 A1 | 9/2016 | Toro et al. | |
| 2020/0139050 A1 | 5/2020 | Nicholas et al. | |

FOREIGN PATENT DOCUMENTS

| | | | |
|---|---|---|---|
| CN | 103210359 | A | 5/2017 |
| CN | 207694025 | U | 8/2018 |
| CN | 110694148 | A | 1/2020 |
| DE | 10-2010-037-084 | A1 | 2/2012 |
| EP | 2434293 | A2 | 3/2012 |
| EP | 3182101 | A1 | 6/2017 |
| EP | 2564185 | | 1/2019 |
| EP | 3192587 | A1 | 7/2020 |
| FR | 2654664 | | 5/1991 |
| JP | 2008-532657 | A | 8/2008 |
| WO | WO 2019/018169 | A1 | 1/2019 |

OTHER PUBLICATIONS

EPO Miscellaneous Notification in European Appln No. 20191379.5, dated Jul. 27, 2021, 11 pages.

Extended European Search Report in European Appln No. 20191379.5, dated Apr. 30, 2021, 10 pages.

Office Action in European Appln. No. 20191379.5, mailed on Jul. 8, 2025, 25 pages.

* cited by examiner

MANUFACTURING CONTAINERS

CROSS-REFERENCE TO RELATED APPLICATIONS

This application is a Division of U.S. patent application Ser. No. 17/403,183 filed Aug. 16, 2021 (now allowed), which claims the benefit of priority to European Application Serial No. 20 191 379.5, filed on Aug. 17, 2020, which is hereby incorporated by reference in its entirety.

TECHNICAL FIELD

This disclosure relates to the manufacturing of containers.

BACKGROUND

Containers or receptacles are used to store goods. In some cases, containers may impact the quality or safety of the goods stored inside them. Manufacturing processes that involve cleanroom conditions and several rounds of testing have been proposed to manufacture containers that meet strict safety and quality requirements.

SUMMARY

One aspect features a holder configured to hold a container during a manufacturing process. The container includes a body that extends along an axis and a flange that extends radially to the axis, and the holder includes one or more fastening elements that are configured to engage one or more of a top surface, a bottom surface, or a peripheral surface of the flange.

In some implementations, the holder includes a support surface configured to support the bottom surface of the flange, and a pair of opposing fastening elements is configured to engage the peripheral surface of the flange and secure the flange to the support surface. In other implementations, the support surface is configured to support the bottom surface of the flange, and the fastening element is configured to apply suction between the support surface of the holder and the bottom surface of the flange. In other implementations, the holder includes a pair of opposing fastening elements, each of which is configured to clamp the top and bottom surfaces of the flange, respectively.

In some implementations, the holder includes a support surface configured to support the bottom surface of the flange and a pair of opposing fastening elements. Each fastening element includes a holding clip configured to engage the top surface of the flange and clamp the bottom surface of the flange against the support surface. In some examples, each holding clip is pivotable about a pivot axis and comprises a biasing element that applies a biasing force that pivots the holding clip about the pivot axis and towards the support surface. In some examples, the holding clip includes an opening element configured to receive an opening force in an opposite direction to the biasing force and pivot the holding clip about the pivot axis and away from the support surface.

In some examples, the holder includes a passageway that extends between a top opening in a top surface of the holder and a bottom opening in a bottom surface of the holder. The passageway extends along a longitudinal axis and is configured to communicate with an interior space of the container, and the longitudinal axis and container axis are coaxial.

Another aspect is a transport device that includes a holder configured to hold a container during a manufacturing process and a base plate that is configured for connection to a conveyor system. The container comprises a body that extends along an axis and a flange that extends radially to the axis. The holder comprises one or more fastening elements that are configured to engage one or more of a top surface, a bottom surface, or a peripheral surface of the flange. The base plate and the holder define a pair of interlocking surfaces that releasably connect the holder and the base plate. The interlocking surface of the base plate defines a recess, and the bottom opening of the holder is received in the recess of the base plate.

In some implementations, the transport device includes an anti-rotation device that prevents the interlocking surfaces from rotating relative to one another around the longitudinal axis. In some constructions, the pair of interlocking surfaces are conical surfaces that form an angle relative to the longitudinal axis of the passageway. The base plate may include one or more pins that extend radially relative to the longitudinal axis, and the interlocking surface of the holder may include one or more radially extending slots that each receive a respective pin, wherein one or more pairs of pins and slots form the anti-rotation device. The interlocking surface of the holder may include a circumferentially extending groove that communicates with each slot of the anti-rotation device.

In some implementation, the holder includes a connection surface configured to engage an external actuator for moving the holder relative to the base plate. A wall of the passageway may form the connection surface. In some constructions, the wall of the passageway that forms the connection surface is conically shaped and forms an angle relative to the longitudinal axis.

In another aspect, a manufacturing system includes a conveyor system; a plurality of transport devices that are each coupled to the conveyor system; and at least one actuator configured to engage the connection surface of each holder and move the holder relative to the base plate.

In some implementations, the actuator includes a motor connected to a drive shaft, and the drive shaft engages the connection surface to lift and rotate the holder relative to the longitudinal axis. In some implementations, the system includes a camera that captures images of the container as the holder is rotated by the actuator. In some implementations the actuator includes a motor connected to a drive shaft, and the drive shaft engages the connection surface to lift and move the holder transversely to the longitudinal axis.

In some implementations, the manufacturing system includes a coating station with a coating nozzle configured travel along the longitudinal axis of the passageway and into the interior of a container to coat an inside wall of the container. In some implementations, the manufacturing system includes an inspection station with a light source positioned below the bottom opening of the holder and configured to emit light through the passageway and into the interior of a container and a receiver positioned on the opposite side of the transport device from the light source and configured to detect the light emitted by the light source.

Another aspect is a method of manufacturing a container including a body that extends along an axis from a first end to a second end, wherein the second end comprises a flange that extends radially to the axis. The method includes the steps of gripping the container by its first end; placing the flange of the container onto a holder that comprises one or more fastening elements; engaging the one or more fastening elements with one or more of a top surface, a bottom surface, or a peripheral surface of the flange; sequentially moving the holder to a plurality of workstations; maintaining the engagement between the one or more fastening elements and the flange as the holder is at each of the plurality of workstations and as the holder is moved between workstations.

In some implementations, the plurality of workstations includes one or more inspection stations, at which the container is rotated about the container axis and inspected using a camera or a sensor. In some implementations, the plurality of workstations includes one or more coating stations, at which one or more surfaces of the container are coated. In some implementations, the plurality of workstations includes one or more assembly stations, at which additional parts are assembled to the container.

In some examples, the container is a syringe barrel that has a hollow needle. The workstations include a first inspection station, at which the barrel is rotated about the barrel axis and an outer surface of the barrel is inspected using a camera or a sensor; a first coating station, at which the surface of the needle is coated; a second coating station, at which an inside surface of the barrel is coated; a second inspection station, at which the barrel is rotated about the barrel axis and the coating of the inside of the barrel is inspected using a camera or a sensor, and/or at which laser light is emitted through the inside of the barrel and through the needle to detect for blockages; a first assembly station, at which a needle cap is loosely placed on the needle; a shaking station, at which the holder, the barrel, and the cap are shaken to align the cap and the needle; a third inspection station, at which the barrel is rotated about the barrel axis and the alignment of the cap and the needle is inspected using a camera or a sensor; a second assembly station, at which the needle cap is pressed onto a tip of the syringe barrel; a fourth inspection station, at which the barrel is rotated about the barrel axis and the needle cap and the needle are inspected using a camera or a sensor.

In implementations in which the container is a syringe barrel, gripping the syringe barrel by its first end may include gripping a barrel tip or a needle connected to the barrel tip.

DESCRIPTION OF THE DRAWINGS

Like reference numbers represent corresponding parts throughout the disclosure.

DETAILED DESCRIPTION

The devices and methods provided herein are described in the exemplary context of manufacturing syringe barrels for pre-filled syringes. However, it should be understood that the devices and methods provided herein may be applied to other types of medical containers, e.g., vials or bottles, as well as to manufacture containers for non-medical applications.

Figure 1A:
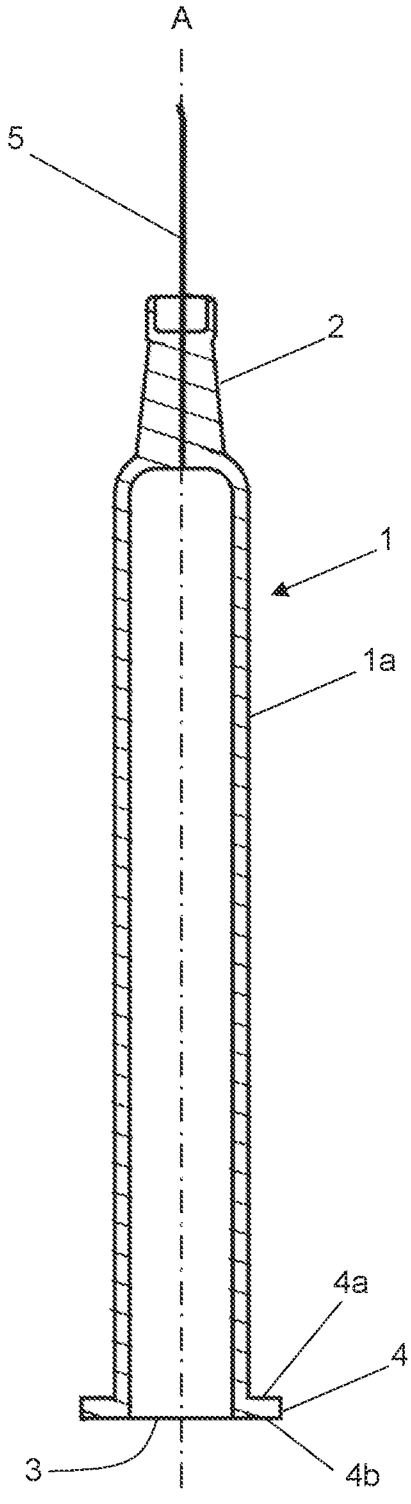
FIGS. 1A to 1D are example views of a container according to the present disclosure.

Referring to FIG. 1A, a syringe barrel 1 (or "barrel") forms part of a syringe, which is used to introduce liquid substances, such as medication, into skin or tissue. A body of the barrel 1 includes a tip 2, an opening 3, and a flange 4. The tip 2 connects the barrel 1 to a hollow needle 5. The needle 5 of FIG. 1A is integrally molded with the tip 2. Alternatively, the needle 5 may be connected to the tip 2 via a suitable connection, such as a Luer Lock®. The opening 3 is sealed by a gasket (not shown). The medication is dispensed by holding the flange 4 and pushing a plunger (not shown) that is connected to a gasket.

Syringe barrels can be made of various materials, such as metal, glass, or polymers (plastics). Some syringes are pre-filled with a single dose of medication. Pre-filled syringes are used to both package and deliver the medication and face certain requirements. For example, the material of the syringe barrel must be free from impurities, so-called extractables and leachables, that affect the stability or efficacy of the medication stored in the barrel. The material of the barrel should also prevent oxygen permeation and form a tight seal with the gasket during storage. High-performance plastics, such as cyclic olefin polymers (COP), may be used for the barrel of a pre-filled syringe.

Figure 7:
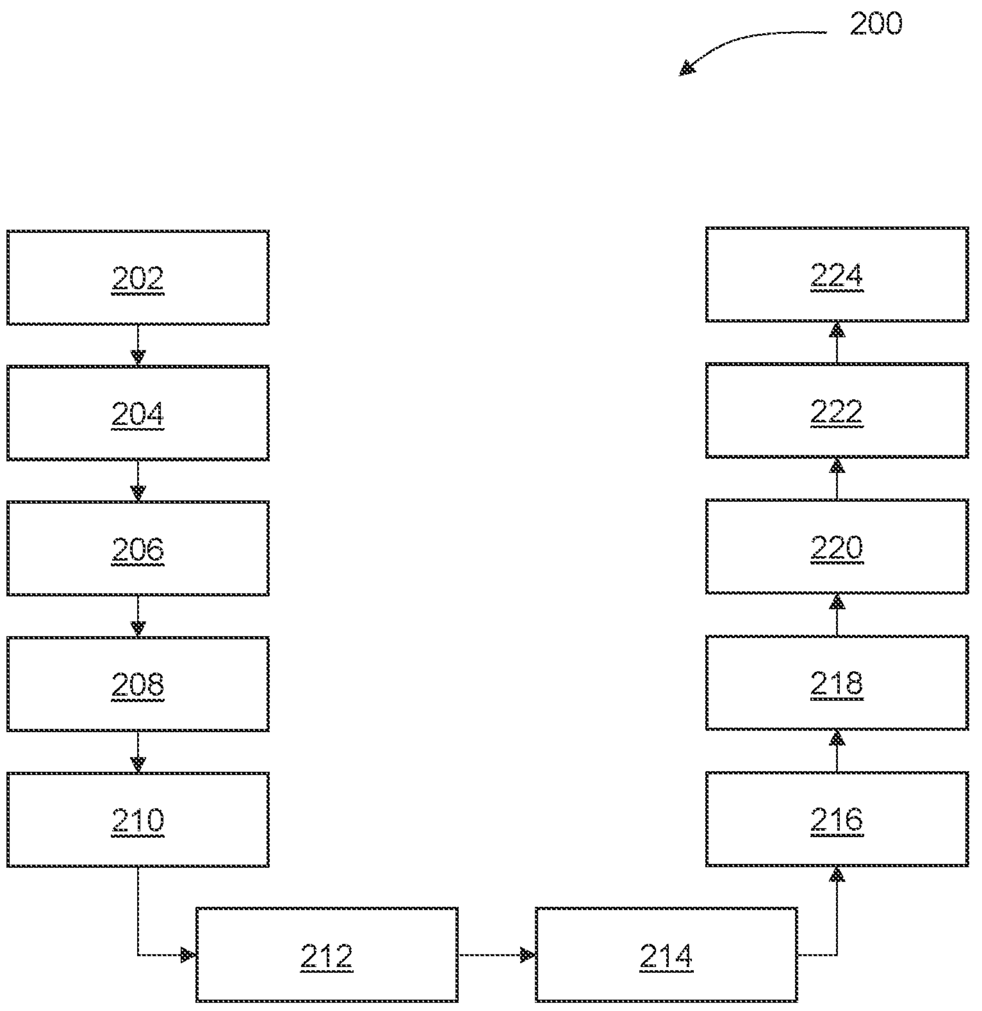
FIG. 7 is an exemplary method of manufacturing a syringe that incorporates the holder and transport devices of the present disclosure.

Generally speaking, syringe barrels are molded, coated, and assembled with a needle cap. There may be quality controls between each of the steps to check the barrels for defects. FIG. 7 describes one example of such a process. The process may be fully automated and performed under clean-room conditions. One consideration in the manufacturing process is to move individual barrels from station to station without damaging the barrels. More specifically, the barrel may be scratched during the manufacturing process. Scratches are difficult to distinguish from dangerous particles in the medication of the pre-filled syringe, render the pre-filled syringe unusable, and increase production costs.

Figure 1B:
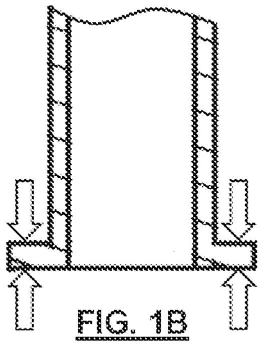
Figure 1C:
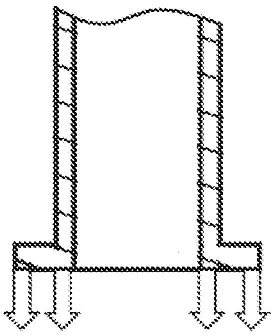
Figure 1D:
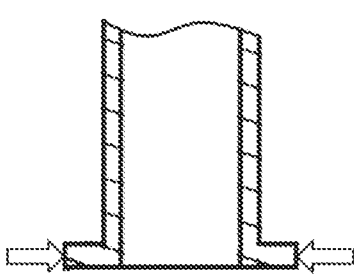

In the present disclosure, the barrel 1 is held by the flange 4, as shown by the arrows in FIGS. 1B, 1C, and 1D. In FIG. 1B, the flange 4 is held on opposite sides at two or more locations around the circumference of the flange 4. An example of a device that holds the flange 4 in this manner is shown in FIGS. 2, 3, 4A, 4B, 5, and 6. Alternatively, the flange 4 of FIG. 1B may be held on the left and right by a device that operates similarly to a clothespin. In FIG. 1C, the flange 4 is suctioned against a surface (not shown), as shown by the downward arrows. In FIG. 1D, the flange 4 is held around the circumference. Generally speaking, the concepts shown in FIG. 1B-1D minimize touching of the barrel surface 1*a* and prevents the barrel 1 from being scratched. Additionally, the concepts of FIG. 1B-1D each secure the barrel 1 at a fixed position along a barrel axis A (FIG. 1A), which reduces the need for sensors to detect the height or position of the barrel 1.

Figure 2:
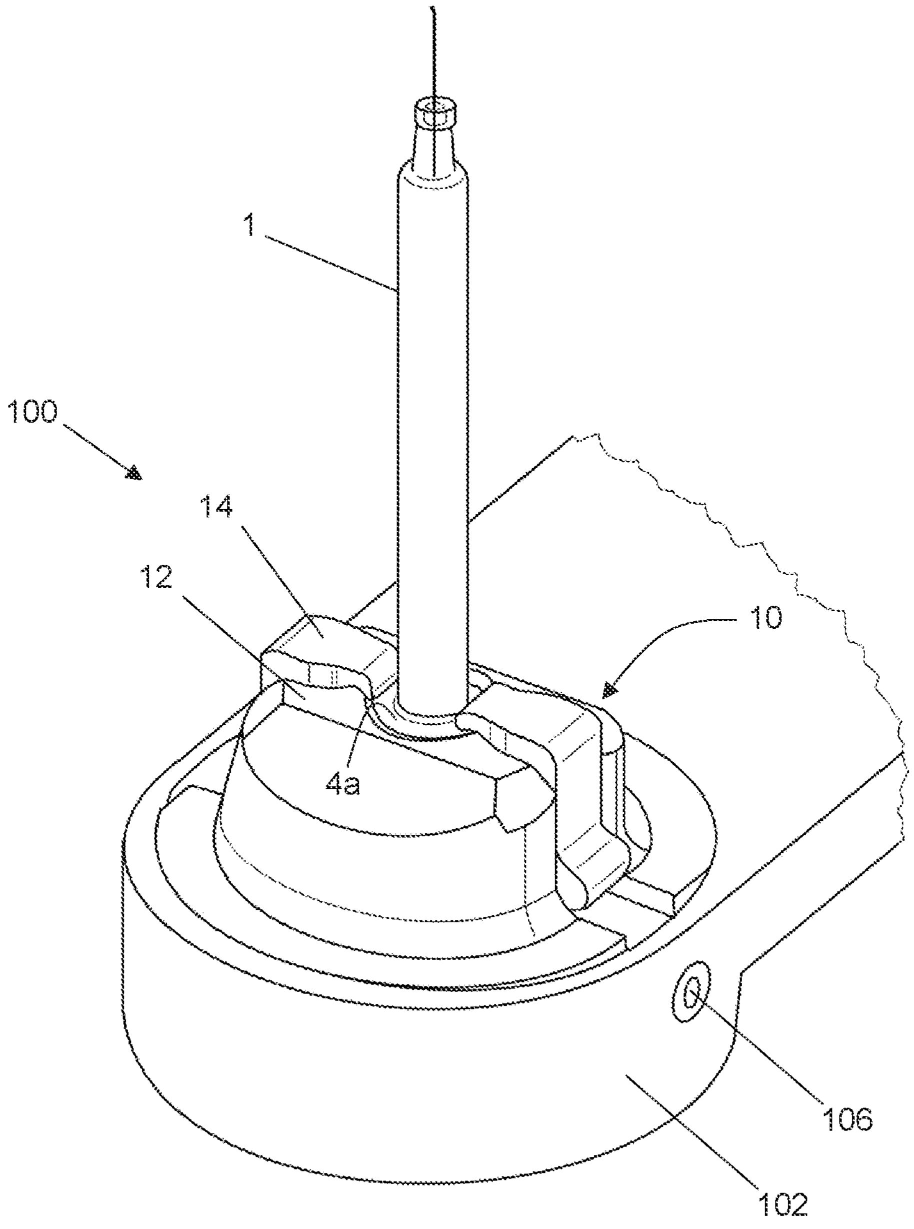
FIGS. 2 and 3 are a perspective and a cross-sectional view of a holder and a transport device according to implementations of the present disclosure.

An example of a holder 10 that holds a barrel 1 according to the concept of FIG. 1B is shown in FIG. 2. The holder 10 includes a support surface 12, that supports a bottom surface 4*b* (FIG. 1A) of the flange 4. As described previously, the support surface 12 serves as a point of reference along the barrel axis A and determines the vertical position of the barrel 1. The support surface 12 may include a recess that corresponds to the shape of the flange 4 and helps to position the flange 4 when it is placed into the holder 10. A pair of fastening elements or holding clips 14 is arranged on opposite sides of the flange 4 and presses the flange 4 against the support surface 12. In the closed position shown in FIG. 2, the holding clips 14 cover approximately ⅓ of a top surface 4*a* of the flange 4. However, it is also conceivable that the holding clips 14 cover more of the top surface 4*a*, i.e., ½, ¾ or even the entire top surface 4*a*. Due to their low height profile, the holding clips 14 expose most of the barrel surface 1*a* for various manufacturing and testing processes.

The holding clips 14 may be opened to fully expose the recess in the support surface 12. A gripper (not shown) that holds the barrel 1 by the needle 5 may drop the barrel 1 onto the holder 10 from above, so that the flange 4 lands in the recess. Once the flange 4 makes contact with the support surface 12, the holding clips 14 may close and engage the top surface 4*a* of the flange 4. The barrel 1 is thus secured in the holder 10, and a conveyor system may move the holder 10 and the barrel 1 to different workstations in a manufacturing system.

Figure 3:
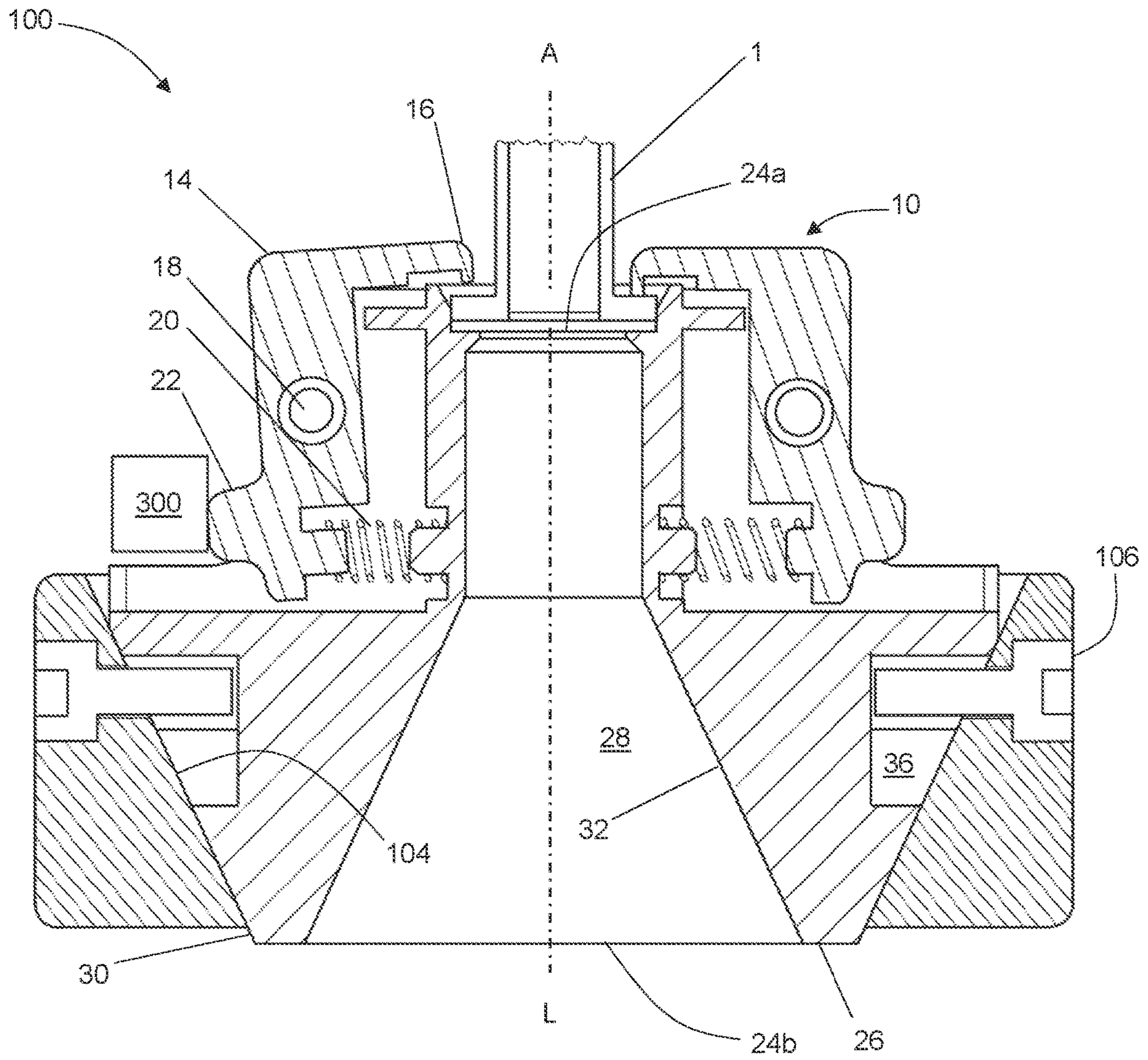

As shown in the cross-section of FIG. 3, each holding clip 14 includes a jaw 16 that engages the top surface 4*a* of the flange 4, a pivot axis 18, a biasing element 20, and an opening element 22. More specifically, each holding clip 14 is mounted to the holder 10 in a manner that the clip 14 can pivot about the axis 18. Referring specifically to the left-hand clip in FIG. 3, the biasing element 20 applies a biasing force to the left, which biases the jaw 16 downward onto the top surface 4*a* of the flange 4, i.e., in a clockwise direction about the pivot axis 18. In other words, the biasing element 20 maintains the holding clip 14 in a closed position. In order to open the holding clip 14, an external actuator 300 that is not part of the holder 10 applies an opening force to the opening element 22 in the opposite direction to the biasing force, i.e., to the right in FIG. 3. The opening force causes the holding clip 14 to pivot in the counterclockwise direction and move the jaw 16 away from the top surface 4*a* of the flange 4, as indicated by the slightly tilted position of the left-hand holding clip 14 in FIG. 3. In contrast, the right-hand holding clip in FIG. 3 is shown with the jaw engaged with the top surface 4*a* of the flange 4. When the actuator 300 removes the opening force, the biasing force of the biasing element 20 returns the holding clip 14 to the closed position.

The combination of the biasing element 20, the opening element 22, and the external actuator 300 enables the holder 10 to hold the flange 4 without the use of additional energy. The illustrated biasing element 20 is a spring, but other types of biasing elements are conceivable. The illustrated opening element 22 is a rounded projection on the holding clip 14, but other elements that enable an actuator 300 to mechanically engage the holding clip 14 may also be used. The illustrated design may be opened and closed without control electronics that form part of the holder 10 itself. However, the biasing element 20 and the opening element 22 may be replaced by corresponding elements that open and close the holding clip 14 via induction.

The concept of FIG. 1D may be implemented similarly to in FIG. 3. Instead of the jaws 16 of the holding clips 14 engaging the top surface 4*a* of the flange 4, a pair of fastening elements may have jaws that squeeze together to apply pressure to the edge of the flange 4. The concept of FIG. 1C may be implemented by providing a fastening element that applies a suction force to the bottom surface 4*b* of the flange 4 via the support surface 12.

The holder 10 of FIGS. 2 and 3 hold the barrel 1 in place as it moves through various workstations in the manufacturing process. In one such station, an external device may coat the needle 5 in silicone or another form of lubricant. In another station, an external device may loosely place a needle cap 6 (FIG. 6) onto the needle 5. In yet another station, an external device may press the needle cap 6 firmly onto the needle 5.

In addition to holding the flange 4, the holder 10 of FIGS. 2 and 3 provides access to the inside of the barrel 1, i.e., the interior space of the barrel 1. More specifically, the holder 10 comprises a top opening 24*a* that communicates with a bottom opening 24*b* in an exposed bottom surface 26 of the holder 10. The top and bottom openings 24*a*, 24*b* define a free space or passageway 28 that communicates with the inside of the barrel 1. A longitudinal axis L of the passageway 28 is arranged coaxially with the barrel axis A. The passageway 28 enables, for example, a laser device to check for blockages in the hollow needle 5. In the illustrated holder 10, the top opening 24*a* is formed in the support surface 12. However, in an implementation in which opposite sides of the flange 4 are gripped by clothespin-like devices, the top opening 24*a* is formed in a top surface of the holder 10 adjacent the opening 3 of the barrel 1.

Figure 4A:
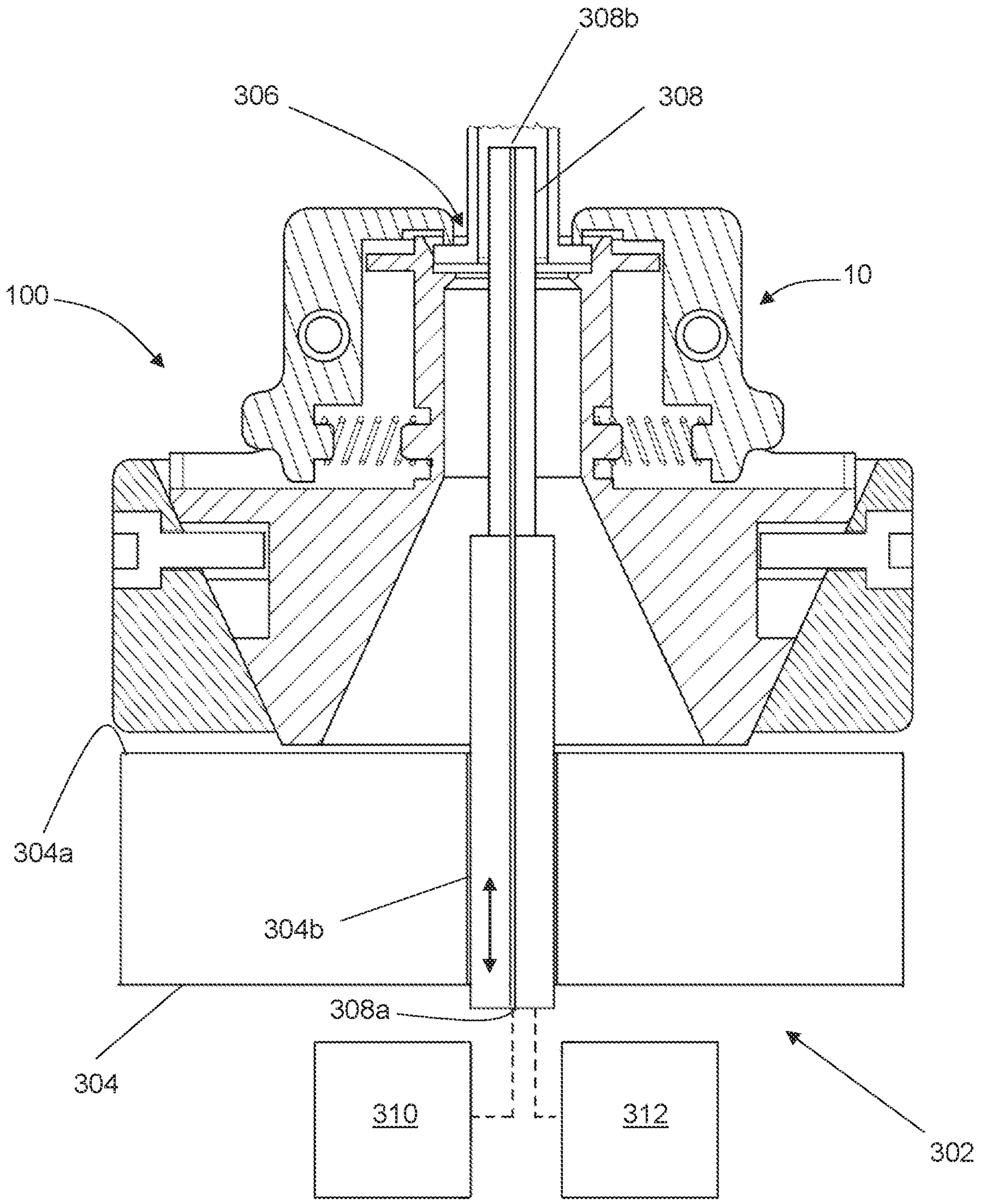
FIGS. 4A, 4B, 5 and 6 are schematic diagrams of the holder and transport device at different types of workstations.
Figure 4B:
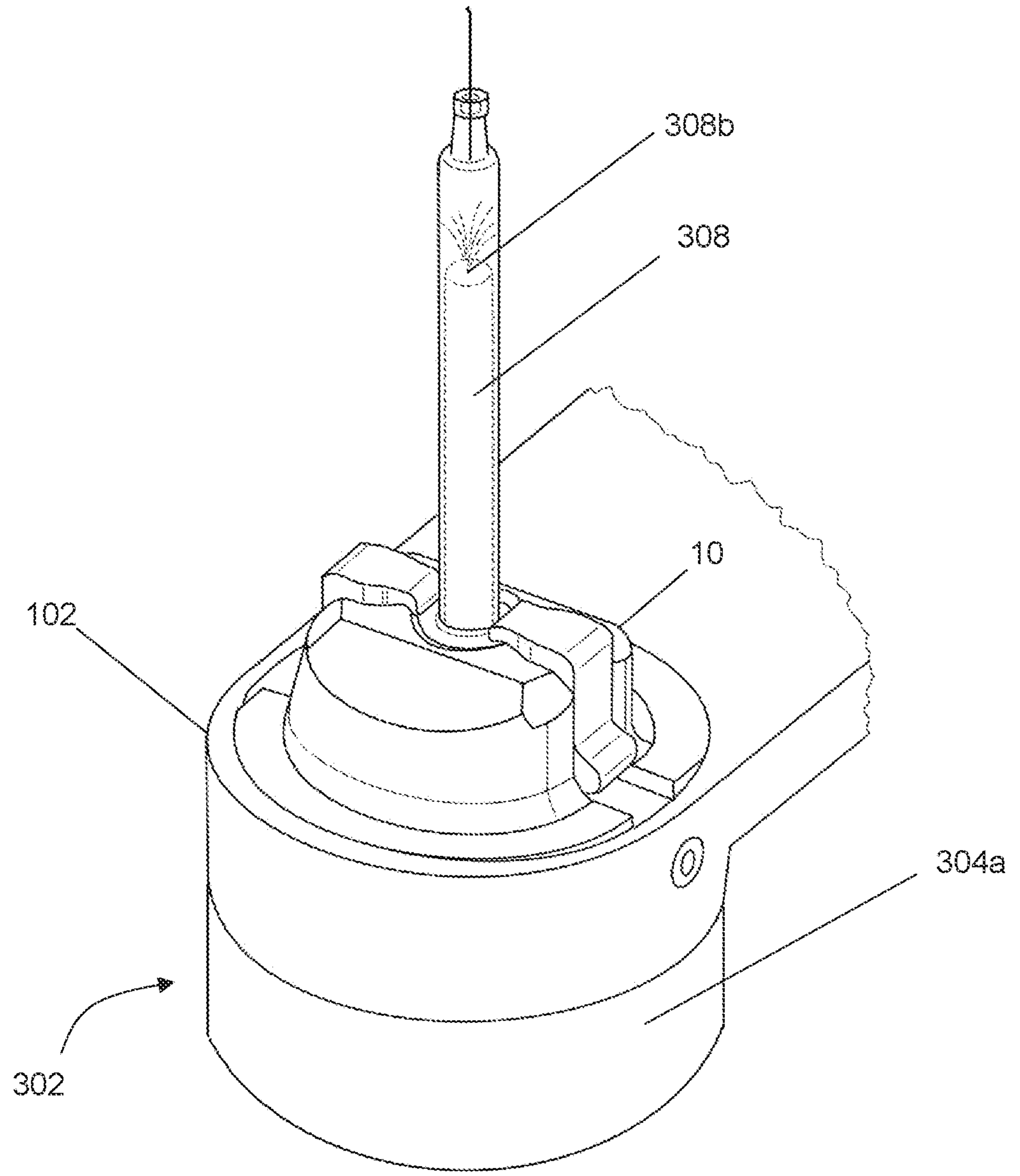

The passageway 28 also enables the inside of the barrel 1 to be coated with lubricant, e.g., silicone, as described in reference to FIGS. 4A and 4B. Coating the inside of a syringe barrel with silicone or a similar substance has several effects. For instance, the silicone helps the gasket to smoothly travel inside of the barrel and enables a precise injection of the medication. The silicone coating may also prevent the material of the barrel from interacting with the medication stored in the barrel. Generally speaking, a nozzle is inserted into the barrel and sprays a thin even coating of silicone on the inside surface of the barrel.

FIG. 4A is a schematic drawing of a coating station 302 for use with the holder 10 of FIG. 3. The coating station 302 includes a coating table 304 and a retractable coating unit 306. The coating unit 306 includes a narrow nozzle 308 that fits inside the barrel 1 with an inlet 308*a* connected to a silicone tank 310 and an outlet 308*b* that sprays the silicone into the barrel 1. The coating unit 306 also includes a motor 312 that moves the nozzle 308 along the longitudinal axis L and the barrel axis A. In the schematic drawing, the motor 312 is shown connected to an intermediate portion of the coating unit 306 that is larger than the nozzle 308. However, the entire coating unit 306 may have the size and shape of the nozzle 308.

During the manufacturing process, the barrel 1 and the holder 10 may be moved to the coating station 302 so that the bottom surface 26 of the holder 10 is positioned above a top surface 304*a* of the coating table 304, and the bottom opening 24*b* of the holder 10 is substantially aligned with an aperture 304*b* in the coating table. Initially, the coating unit 306 is retracted through the aperture 304*b* to prevent a collision between the nozzle 308 and the holder 10. Once the holder 10 and the barrel 1 are in place, the motor 312 moves the nozzle 308 upwards, through the passageway 28, and into the barrel 1 (FIG. 4B). Once the nozzle 308 is adjacent the barrel tip 2, the nozzle 308 begins to spray silicone, as the motor 312 retracts the nozzle 308 in a downward direction. This general process also applies in cases in which a material other than silicone is sprayed onto the inside of the barrel 1.

In addition to the holder 10, the present disclosure also describes a transport device 100 that enables the barrel 1 to be moved relative to the barrel axis A. Returning to FIG. 2, the transport device 100 includes a holder 10 that may have any of the features described above and a base plate 102 that couples the holder 10 to a conveyor system (not shown). The conveyor system may be a linear conveyor or a rotating worktable, for example.

Referring again to FIG. 3, the base plate 102 and the holder 10 each comprise one of a pair of interlocking surfaces 104, 30. The interlocking surfaces 104, 30 are shown as conical surfaces, which can easily be centered or aligned. However, other designs for the interlocking surfaces 104, 30 may also be used. For example, a centering pin (not shown) may be used to instead of conical surfaces. In any case, the interlocking surface 104 of the base plate 102 is designed so as not to block the bottom opening 24*b* of the passageway 28. For example, the interlocking surface 104 defines a recess or opening 105 in a bottom surface of the base plate 102, and the holder 10 is arranged so that the bottom opening 24*b* is arranged in, i.e., accessible through, the recess 105 (FIG. 5).

An actuator (not shown) that is external to the transport device 100 may move the holder 10 and the barrel 1 along the barrel axis A to separate or disengage the interlocking surfaces 104, 30. For this purpose, the holder 10 includes a connection surface or element 32 that engages the external actuator. In FIG. 3, the connection surface 32 is a section of the wall of the passageway 28 that has a conical shape. This allows the holder 10 and the external actuator to axially align, similarly to the interlocking surfaces 104, 30. Alternatively, the holder 10 may also form half of a dog clutch as the connection element 32. The connection element 32 allows the holder 10 to be lifted by an external actuator instead of a device that is internal to the holder 10 itself.

In some manufacturing steps, it is also necessary to rotate the barrel 1 about the barrel axis A. In some implementations, the external actuator may lift and then rotate the holder 10 relative to the base plate 102. The transport device 100 may include an anti-rotation device that prevents the holder 10 from rotating relative to the base plate 102 when the anti-rotation device is engaged.

Figure 5:
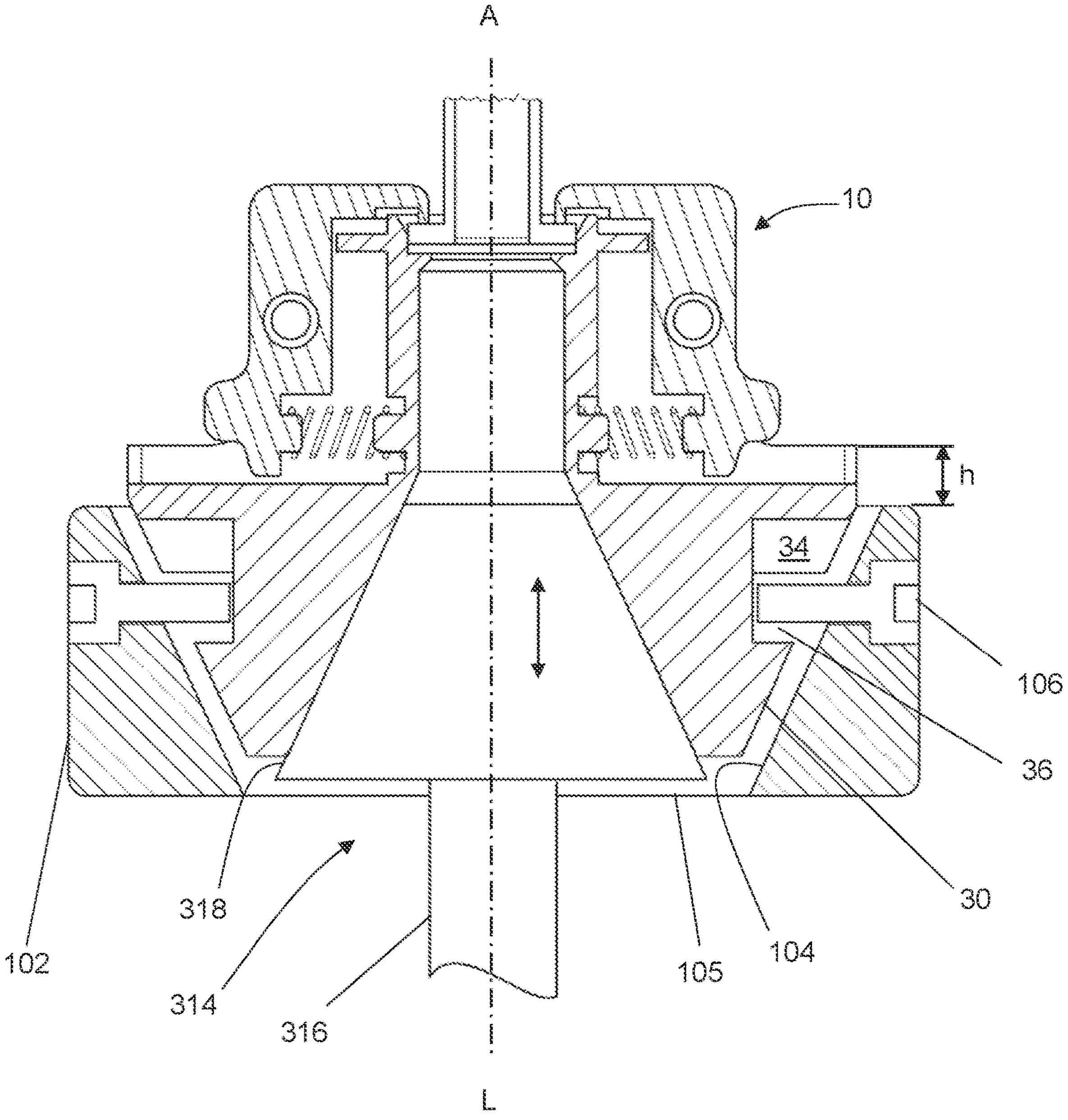

As shown in FIG. 5, the base plate 102 may include at least one radial pin 106 (FIG. 2) that extends radially relative to the longitudinal axis L and the barrel axis A. The holder 10 may include a radial slot 34 that receives and engages the radial pin 106. The radial pin 106 and the radial slot 34 form an anti-rotation device. The anti-rotation device may include multiple pairs of pins 106 and slots 34. For example, FIG. 5 shows two such pairs. The transport device 100 may also have a different anti-rotation device (e.g. a key and slot) that is based on other parts of the holder 10 and the base plate 102.

FIG. 5 also includes a schematic drawing of a rotation device 314 for use with the transport device 100. The rotation device 314 includes a drive shaft 316 that is connected to a motor (not shown). The drive shaft 316 includes a conical drive surface 318 that engages the conical wall of the passageway 28 by friction to lift and rotate the holder 10. As shown by the arrows, the holder 10 is lifted to a height h that corresponds approximately to the depth of the radial slot 34 to disengage the anti-rotation device. The lifting movement aligns the radial pin 106 with a circumferentially extending groove 36 in the holder 10, which allows the holder 10 to rotate about the axes L, A. Similarly to the coating unit 306, the rotation device 314 may initially be retracted to a lower position to avoid collision with a bottom surface of the transport device 100.

Figure 6:
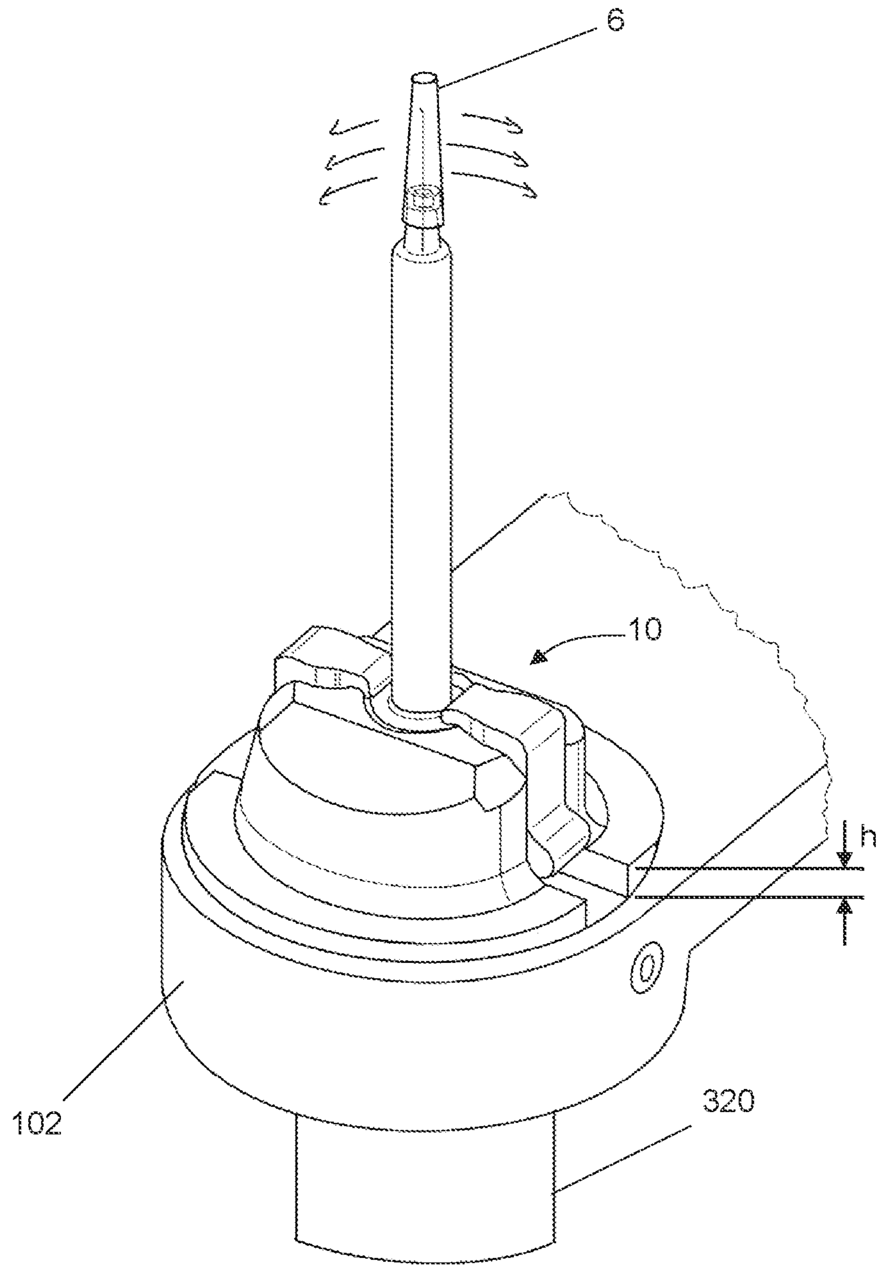

Rotation of the holder 10 and the barrel 1 by the rotation device 314 may be used, for example, to inspect the barrel 1 or the needle 5 using cameras or other optical sensors. Such inspection processes may be used to check the quality of the molding process, the silicone coating process, or the placement of the needle 5 in the needle cap 6 (FIG. 6). The aforementioned processes do not necessarily require access to the inside of the barrel 1. In other words, a holder 10 that does not include a passageway 28 to the inside of the barrel 1 can also be rotated via an external actuator. However, in the illustrated transport device 100, the passageway 28 provides access to the interior of the barrel 1 and also couples the holder 10 to an external actuator to rotate the barrel 1. Accordingly, the illustrated transport device 100 is suitable for a wide range of workstations and processing steps. Keeping the barrel 1 on the same transport device 100 reduces the need to handle the barrel 1, which may also prevent further scratching of the barrel 1.

FIG. 6 is a schematic drawing of the transport device 100 and a shaking device 320. The shaking device 320 may have a motor, a drive shaft, and drive surface (not shown) similar to the drive shaft 316 and the drive surface 318 of the rotation device 314. Instead of rotating the holder 10 about the axes L, A, the shaking device 320 may lift the holder 10 by a height h to disengage the anti-rotation device and move the holder 10 transversely to the axes L, A, i.e., shake the holder 10 and the barrel 1. The arrows in FIG. 6 indicate the shaking movement of the holder 10 and the barrel 1. Alternatively, a single device may implement both the rotation device 314 and the shaking device 320. Although FIG. 6 shows the holder 10 raised by the same height h as in FIG. 5, this is not necessarily the case. The heights may be different, with the height in FIG. 5 larger than the height in FIG. 6, or vice versa.

As part of the manufacturing process, a needle cap 6 may be placed on the needle 5. The tip of the needle 5 may catch on the inner surface of the needle cap 6. Pushing down on the needle cap 6 in this state may damage the tip of the needle 5 and render the assembled syringe unusable. Shaking the needle 5 and the loosely placed needle cap 6 may dislodge the needle tip and ensure proper alignment of the needle 5 and the cap 6 before final assembly.

FIG. 7 is a flow chart of an example manufacturing process 200 that incorporates the devices described above. In a first step 202, a syringe barrel 1 may be molded to a needle 5 by injection molding. The finished barrel 1 may be removed to a storage tray before being placed on the transport device 100. Molding the needle 5 integrally with the barrel 1 has the advantage, e.g., that the barrel 1 can be held by the needle 5 to transfer the barrel 1 to the transport device 100. However, if the needle 5 is not integrally formed with the barrel 1, a gripper may also hold the barrel 1 by the tip 2.

In step 204, the barrel 1 and the needle 5 may be rotated by a rotation device 314 and inspected for defects. The inspection may incorporate the use of cameras, lights, and other sensors. In step 206, the needle 5 may be coated with silicone or a similar material. In this step, the barrel 1 does not rotate. In step 208, the transport device 100 moves to a coating station 302 where the inside of the barrel 1 is coated with silicone. In step 210, the transport device 100 moves to a further workstation that includes a rotation device 314, cameras, lights, and sensors that inspect the quality of the silicone coating. In step 212, the transport device 100 moves to a further workstation that includes a laser that shines through the passageway, the barrel 1, and the hollow needle 5 and a sensor above the needle 5 that inspects the needle 5 for blockages. In step 214, a further workstation loosely places a cap 6 on the needle 5. In steps 212 and 214, the holder 10 may remain stationary relative to the base plate 102. In step 216, a shaking device 320 may shake the holder 10 to align the needle 5 and cap 6. In step 218, a rotation device 314, cameras, lights, and sensors may be used to inspect the alignment of the needle 5 and cap 6. In step 220, an external device may press the cap 6 downwards to attach the cap 6 to the barrel tip 2. Following a final inspection in step 222, the syringe barrel 1 may be packaged in step 224 for further processing.

In FIG. 7, the barrel 1 is attached to the holder 10 of the transport device before step 204 and remains attached to the holder 10 until after step 222. The order or number of steps 204-222 can be changed to suit the specific manufacturing process. Certain steps may be omitted, and the order of the steps may be changed. For example, a modified process may omit one or more of the external actuators, e.g., the shaking device 320. In a simple or abbreviated manufacturing process, the holder 10 may travel from one workstation to the next without rotating the barrel 1. For example, the inspection device may rotate relative to the barrel 1. According to the present disclosure, the barrel 1 remains attached to the holder 10 of the transport device 100 as it travels from one workstation in the manufacturing process to the next.

Furthermore, although the holder 10, the transport device 100, and the manufacturing process 200 are described for a syringe barrel 1, the same can be used for a vial or other type of container that also includes a radial flange.

While this specification contains many specific details of implementations, these should not be construed as limitations on the scope of any invention or of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in combination with one another. Moreover, although features may be described herein as acting in certain combinations and even initially claimed as such, one or more features from a claimed combination can in some cases be excised from the combination, and the claimed combination may be directed to a sub-combination of features.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described herein should not be understood as requiring such separation in all implementations.

Particular implementations of the subject matter have been described. Other implementations are within the scope of the following claims.

The invention claimed is:

1. A method of manufacturing a container comprising a body that extends along an axis between a first end and a second end, wherein the second end comprises a flange that extends radially to the axis, the method comprising the steps of:

gripping the container by its first end;

placing the flange of the container onto a holder that comprises one or more fastening elements and a support surface, the one or more fastening elements comprising a pair of opposing fastening elements, and each fastening element of the pair of fastening elements comprising a holding clip, wherein placing the flange of the container on the holder comprises supporting a bottom surface of the flange with the support surface;

engaging the one or more fastening elements with one or more of a top surface, the bottom surface, or a peripheral surface of the flange, wherein engaging the one or more fastening elements comprises engaging the top surface of the flange with the holding clips and clamping the bottom surface of the flange against the support surface;

sequentially moving the holder to a plurality of workstations; and maintaining the engagement between the one or more fastening elements and the flange as the holder is at each of the plurality of workstations and as the holder is moved between workstations.

2. The method of claim 1, wherein the plurality of workstations comprises one or more inspection stations, at which the container is rotated about the axis and inspected using a camera or a sensor.

3. The method of claim 1, wherein the plurality of workstations comprises one or more coating stations, at which one or more surfaces of the container are coated.

4. The method of claim 1, wherein the plurality of workstations comprises one or more assembly stations, at which additional parts are assembled to the container.

5. The method of claim 1, wherein the container is a syringe barrel, and gripping the syringe barrel by its first end comprises gripping a barrel tip or a needle connected to the barrel tip.

6. The method of claim 1, wherein engaging the one or more fastening elements with one or more of the top surface, the bottom surface, or the peripheral surface of the flange further comprises engaging the peripheral surface of the flange with the pair of opposing fastening elements to secure the flange to the support surface.

7. The method of claim 1, wherein engaging the one or more fastening elements with one or more of the top surface, the bottom surface, or the peripheral surface of the flange further comprises applying suction, with the pair of opposing fastening elements, between the support surface of the holder and the bottom surface of the flange.

8. The method of claim 1, wherein engaging the one or more fastening elements with one or more of the top surface, the bottom surface, or the peripheral surface of the flange further comprises clamping the top surface and the bottom surface of the flange with the pair of opposing fastening elements.

9. The method of claim 1, wherein:

each holding clip is pivotable about a pivot axis and comprises a biasing element, and maintaining the engagement between the one or more fastening elements and the flange comprises applying a biasing force, with the biasing element, against the holding clip to pivot the holding clip about the pivot axis and toward the support surface.

10. A method of manufacturing a container comprising a body that extends along an axis between a first end and a second end, wherein the second end comprises a flange that extends radially to the axis, the method comprising the steps of:

gripping the container by its first end;

placing the flange of the container onto a holder that comprises one or more fastening elements;

engaging the one or more fastening elements with one or more of a top surface, a bottom surface, or a peripheral surface of the flange;

sequentially moving the holder to a plurality of workstations; and maintaining the engagement between the one or more fastening elements and the flange as the holder is at each of the plurality of workstations and as the holder is moved between workstations, wherein the container is a syringe barrel and comprises a hollow needle, the axis is a barrel axis, and wherein the plurality of workstations comprises:

a first inspection station, at which the barrel is rotated about the barrel axis and an outer surface of the barrel is inspected using a camera or a sensor;

a first coating station, at which a surface of the needle is coated;

a second coating station, at which an inside surface of the barrel is coated;

a second inspection station, at which the barrel is rotated about the barrel axis and the coating of the inside surface of the barrel is inspected using a camera or a sensor, and at which laser light is emitted through the inside of the barrel and through the needle to detect for blockages;

a first assembly station, at which a needle cap is loosely placed on the needle;

a shaking station, at which the holder, the barrel, and the cap are shaken to align the cap and the needle;

a third inspection station, at which the barrel is rotated about the barrel axis and the alignment of the cap and the needle is inspected using a camera or a sensor;

a second assembly station, at which the needle cap is pressed onto a tip of the syringe barrel; and a fourth inspection station, at which the barrel is rotated about the barrel axis and the needle cap and the needle are inspected using a camera or a sensor.

11. The method of claim 10, wherein:

the holder comprises a support surface; and placing the flange of the container onto the holder comprises supporting the bottom surface of the flange with the support surface.

12. The method of claim 11, wherein:

the one or more fastening elements comprises a pair of opposing fastening elements, and each fastening element of the pair of opposing fastening elements comprises a holding clip; and engaging the one or more fastening elements with one or more of the top surface, the bottom surface, or the peripheral surface of the flange comprises engaging the top surface of the flange with the holding clips and clamping the bottom surface of the flange against the support surface.

* * * * *